INVENTOR.
ORLAND O. SCHAUS

United States Patent Office 3,452,669
Patented July 1, 1969

3,452,669
APPARATUS FOR CONTINUOUS LAUTERING
Orland Otto Schaus, 20 St. Dennis Drive,
Don Mills, Ontario, Canada
Original application Apr. 5, 1965, Ser. No. 445,384.
Divided and this application Mar. 21, 1968, Ser.
No. 715,038
Int. Cl. C12f 1/02; C12c 7/00, 9/00
U.S. Cl. 99—276          5 Claims

ABSTRACT OF THE DISCLOSURE

This invention relates to apparatus for continuously lautering brewer's mash wherein the mash is deposited on a foraminous rotating table, the foraminations being of a size to screen the grains from the mash and return the extracting liquid passing therethrough. An important feature of the table type support means for the mash is its rigidity. It is desirable to support the mash during the lautering process in a rigid fashion so that the bed of brains will not crack due to shifting of the supporting medium. The rotating table of the apparatus described in this invention is especially effective in this respect. Means are provided for depositing the mash on the table in the form of a filter bed and for sweeping the filter bed from the table after the extracting liquid has drained therefrom.

---

Figure 1:
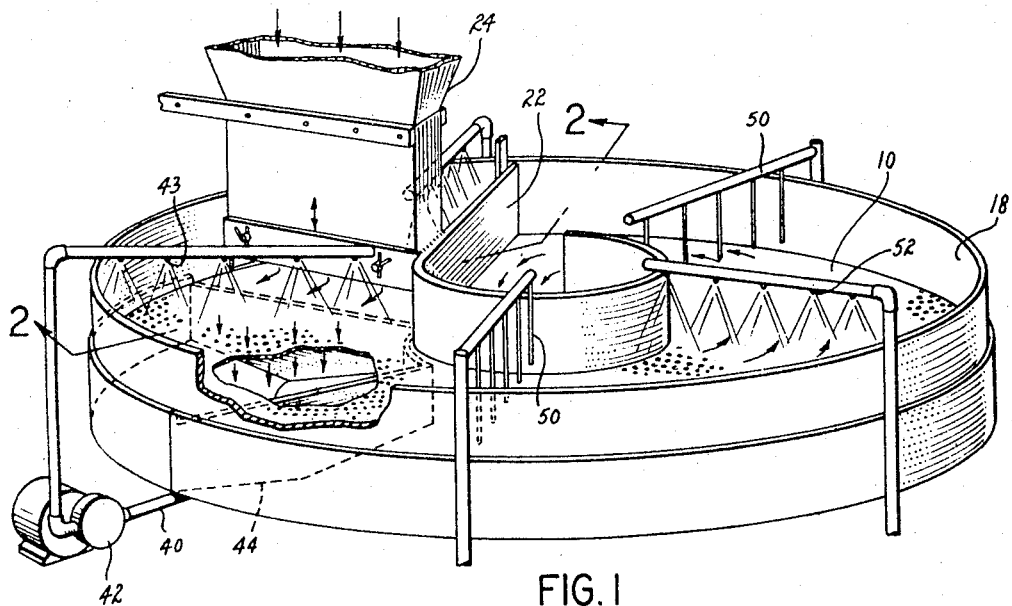

This invention relates to apparatus for continuously lautering brewer's mash and is a division of co-pending application Ser. No. 445,384, filed Apr. 5, 1965.

The lautering of brewer's mash on a continuous, as distinct from a batch basis, has for some years been a problem without satisfactory answer. During the past ten years new brewing techniques in which the wort is fermented on a continuous basis have been developed. The full benefit of these continuous fermenting techniques from a production point of view can only be realized if they are combined with a continuous mashing and lautering technique. Continuous lautering has to date been difficult to do. At least two approaches have been tried, each with less than entirely satisfactory results.

Centrifugal separators have been used to separate the spent grains from the extracting liquid of the mash. Separators of this type are costly to install, difficult to maintain because of high rotational speeds and subject to breakdown, with the result that the continuity of the process is often broken. Moreover, they do not give complete separation of solids and liquid.

In a different method of the prior art the mash is spread on the upper flight of a moving perforate belt conveyor, the perforations of which are of sufficient size to support the spent grains in a filter bed but large enough to let the extracting liquid of the mash pass therethrough. The method has been used with some success, but difficulty is often encountered as the filter bed of spent grains through which the extracting liquor passes cracks and loses its filtering value. Cracking is caused by movement of the flexible conveyor belt or by friction between the flexible belt and its support structure. Moreover, it will also be apparent that only the upper flight of the conveyor can be used for filtering purposes so that in effect only one-half of the filter surface provided is in actual use at any on time. The equipment is relatively bulky because the path of the conveyor belt must be in a single straight line.

It is, therefore, an object of this invention to provide a filtering apparatus for brewer's mash that is capable of supporting the mash in a filter bed which elimates the danger of cracking the filter bed. It is also an object of the invention to provide an apparatus for lautering brewer's mash that makes a more efficient utilization of the filtering surface.

It is a still further object of the invention to provide apparatus for lautering brewer's mash that is compact.

With these and other objects in view, lautering apparatus for brewer's mash according to this invention generally comprises a foraminous rigid table, table mounting means for rotatably mounting the table about an axis substantially at right angles to the plane thereof, the table having foraminations of a size to screen the grains from the mash in use and let the extracting liquid pass therethrough. Means are also provided for rotating the table and for depositing brewer's mash on the table at a distance from the centre of rotation thereof, whereby the mash is spread on the table in a filter bed of annular configuration as the table is rotated in use by the table rotating means. Sweeping means for sweeping the filter bed of mash from the table are provided and collecting means are provided under the table for collecting the extracting liquid from the mash. The apparatus will be clearly understood after reference to the following detailed specification read in conjunction with the drawings.

Figure 2:
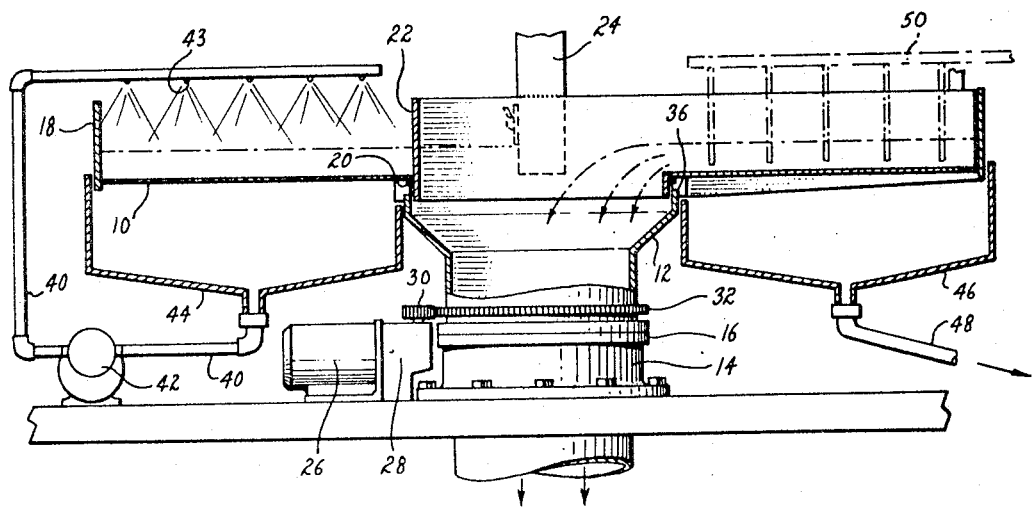

In the drawings:
FIGURE 1 is a perspective view of lautering apparatus according to this invention, and
FIGURE 2 is a sectional view along the line 2—2 of FIGURE 1.

Referring to the drawings, the apparatus for lautering brewer's mash there illustrated comprises a foraminous rigid table 10 of annular configuration supported at its centre by the tubular pillar 12, which is in turn rotatably mounted on the tubular floor supported base 14 by means of bearings contained in the illustrated exterior flanges illustrated at 16. Detail of the bearing arrangement is not illustrated in the drawings since it is of standard design.

The table 10 is made of steel and has an exterior circumferential fence 18 at its outer edge and a resilient seal 20 at its inner edge which engages with the plough sweeping structure 22 that is in turn carried by the feed hopper 24. Feed hopper 24 is mounted rigidly with respect to the floor but independently of the table to overlie the table as illustrated and will be referred to in more detail later.

A motor 26 connects through a transmission, generally indicated by the numeral 28, with the pinion gear 30 to rotate the table through the gear 32, which is in turn carried by the support pillar 12. It will be noted that support pillar 12 connects with the table at its inner edge by means of a circumferentially extending moulding 36 so that operation of the motor to rotate gear 30 will in turn rotate the table past the above mentioned rigidly mounted feed hopper 24.

Underneath the table there is mounted two annular wort tanks for the purpose of collecting the extracting liquor or wort from the mash in use. Means including pipes 40 and pump 42 and spray nozzles 43 are provided for returning wort from the tank 44 to a bed of mash overlying the table 10. Piping means 48 are provided for conducting clear wort collected in the tank 46 away therefrom. Rakes 50 are provided for breaking the top crust of a bed of mash on the table to facilitate better drainage and inlet pipes and sparging nozzles 52 are provided for adding sparge water to a bed of mash on the table.

To lauter mash with the apparatus described herein the mash is fed onto the table 10 through the rigidly mounted feed hopper 24 as the table is rotated thereunder by means of the motor 26 and its gear train above described. It will be noted that the mash feed hopper extends radially across the annular configuration of the table whereby mash is formed in a bed concentric with the centre of rotation of the table as the table rotates.

As described above, the table has foraminations therein of a size that will screen the grains from the mash and let the extracting liquor pass therethrough. When the mash is initially deposited on the table the liquor tends to run through rather freely and is collected in the first tank 44. This liquor is cloudy because it has not been filtered through a bed of settled grains from mash. It therefore is returned to the bed for recirculation by means of the pump 42, pipe 40 and their associated spray heads.

As the grains settle on the table 10 they tend to form themselves into a bed that acts as a filter for the extracting liquor. Thus, once the filter bed is formed, the extracting liquor passing therethrough is filtered by the filtering action of the grains. This liquor is clear wort and enters the wort collecting tank 46. It will be apparent that the location of the cloudy wort return nozzles 43 should be sufficiently far from the feed hopper 24 to enable the bed of grain formed on the table 10 to settle sufficiently to form itself into a filter.

As the table moves in a counter-clockwise direction, filtering of the extractant takes place as the extractant passes through the grains. The top crust of the bed may tend to become hard and less permeable than the mash and to overcome this, rakes 50 are provided which break the top inch or so of the annular bed of grains from the mash and permit any contained moisture to pass through the filter bed.

In order to remove as much as possible of the valuable sugars from the grains on the table, a sparge line 52 is provided which sprays warm water onto the bed of grains as it passes thereunder. The water filters through the bed and is collected by the wort collecting tank 46.

After the grains have travelled on the table a sufficient time to permit most of the extracting liquor of the mash to pass therefrom and through the rigid screen 10, they encounter the plough 23 which extends radially across the support table 10 and is arranged to sweep the grains from the table into the tubular chute provided by the interior of the table support 12 and the base 14. From the bottom of the base the spent grains are taken to waste.

A feature of the invention is the rigidity of the table 10 upon which the mash is spread. This table is able to support the overlying bed very firmly and substantially eliminates any possibility of cracking of the filter bed by reason of yielding of the filter bed or frictional contact of the bed with another structure. It will be apparent that the device is compact and that substanially all of the foraminous surface supports grain.

A table having an outside diameter of about 12 feet with an open chute diameter for the spent grains of about four feet are practical sizes but it will be appreciated that these things can be varied. The speed of rotation varies with the height of the bed of grains and the degree of filtering sought but with the grains arranged about 12 inches deep the speed of rotation should be arranged such that the grain takes about 1.5 hours to travel from the hopper 24 to the discharge gate 23.

Modifications which affect these design features can be incorporated and will be apparent to those skilled in the art.

For example, slight vacuum can be applied to the underside of the filter bed to accelerate drainoff. This would permit a faster operation of the table for equivalent filtering effect.

Other modifications based on known filter practice will be apparent to those skilled in the art and it is not intended that the foregoing description be read in a limiting sense.

What I claim as my invention is:

1. Apparatus for lautering brewer's mash comprising a foraminous rigid table, table rotating means for rotatably mounting said table about an axis substantially at right angles to the plane thereof, said table having foraminations of a size to screen the grains from said mesh and let the extracting liquid pass therethrough, means for rotating said table, means for depositing brewer's mash on said table at a distance from the centre of rotation thereof whereby said mash is spread on said table in a filter bed of annular configuration as said table is rotated in use by said table rotating means, sweeping means for sweeping a filter bed of mash from said table, collection means under said table for collecting extracting liquid that passes through said table.

2. Apparatus for lautering brewer's mash as claimed in claim 1, in which said collecting means comprises at least two collecting tanks, the first one of said collecting tanks being adjacent where said means for depositing brewer's mash on said table drops mash on said table, the second tank being spaced from said first tank.

3. Apparatus for lautering brewer's mash as claimed in claim 2, having means for returning extracting liquid from said first tank to a bed of grains on said table in use for filtering through said bed and collection in said second tank.

4. Apparatus for lautering brewer's mash as claimed in claim 2, having rake means for breaking the crust of a bed of grain on said table in use.

5. Apparatus for lautering brewer's mash as claimed in claim 2, having sparge liquid means overlying said table and overlying said second tank.

References Cited

UNITED STATES PATENTS

| | | | |
|---|---|---|---|
| 2,758,030 | 8/1956 | Metz | 99—52 |
| 2,948,617 | 8/1960 | Paine | 99—52 |
| 2,961,316 | 11/1960 | Cook | 99—52 |
| 3,161,522 | 12/1964 | Compton | 99—52 |

ROBERT W. JENKINS, *Primary Examiner.*

U.S. Cl. X.R.

99—52

UNITED STATES PATENT OFFICE
CERTIFICATE OF CORRECTION

Patent No. 3,452,669     Dated July 1, 1969

Inventor(s) Orland Otto Schaus

It is certified that error appears in the above-identified patent and that said Letters Patent are hereby corrected as shown below:

The patent inadvertently and erroneously issued to Orland O. Schaus.

The patent should have issued - Orland O. Schaus, assignor to Canadian Breweries Limited, Toronto 2, Ontario.

SIGNED AND
SEALED
AUG 25 1970

(SEAL)
Attest:

Edward M. Fletcher, Jr.
Attesting Officer

WILLIAM E. SCHUYLER, JR.
Commissioner of Patents

FORM PO-1050 (10-69)